United States Patent Office 3,437,236
Patented Apr. 8, 1969

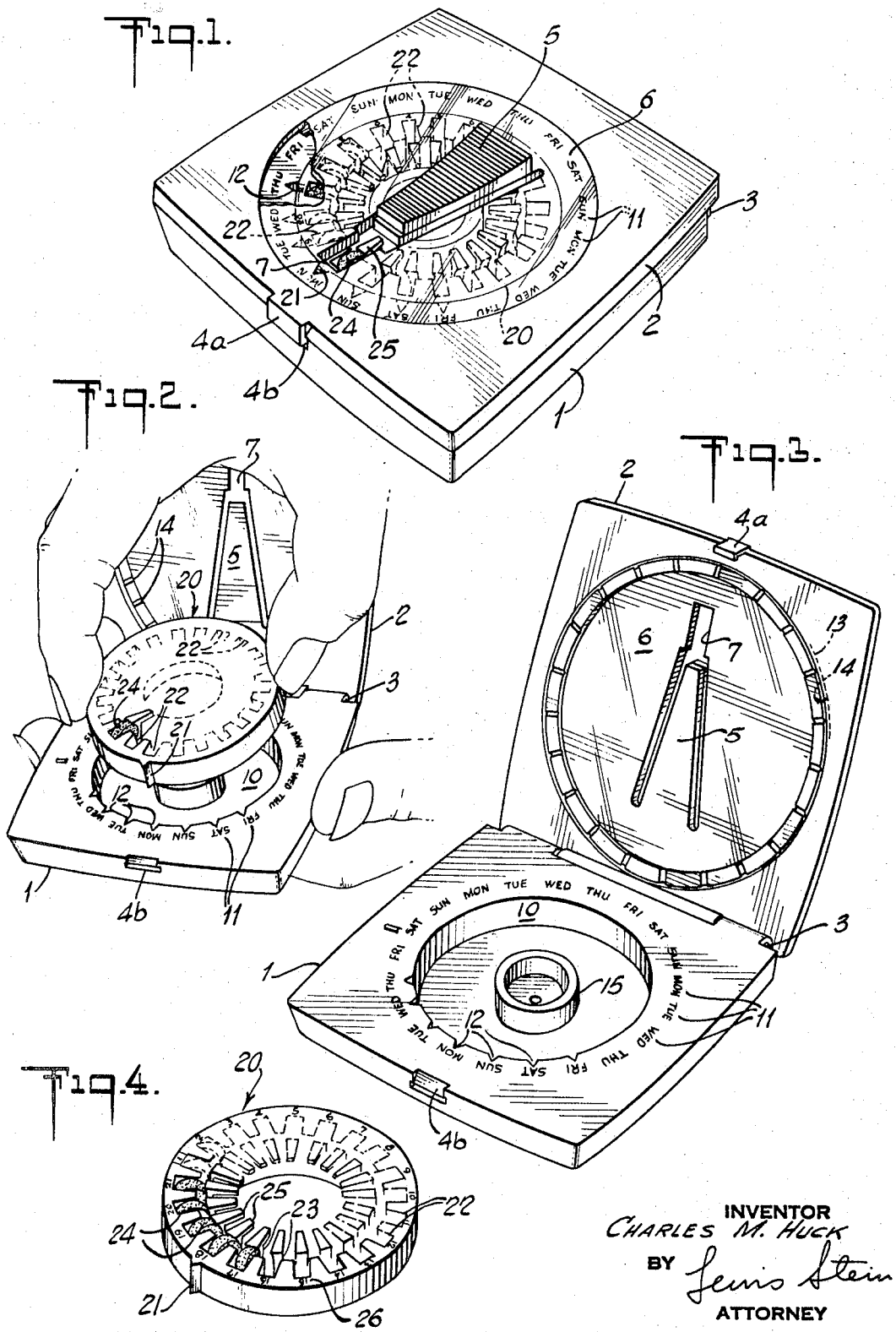

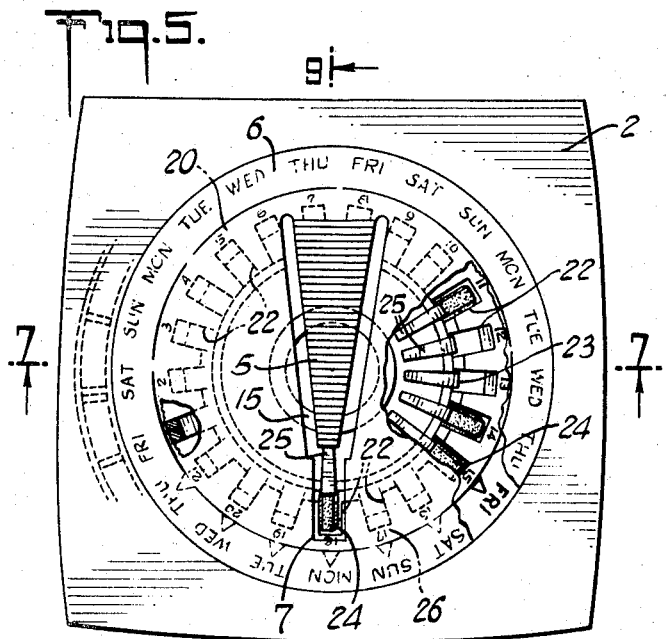
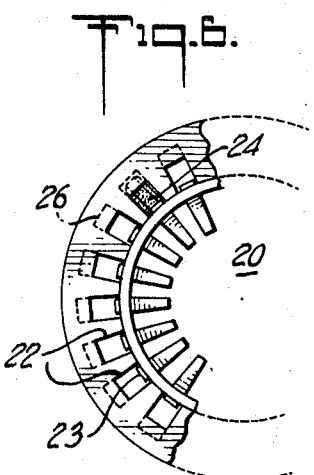
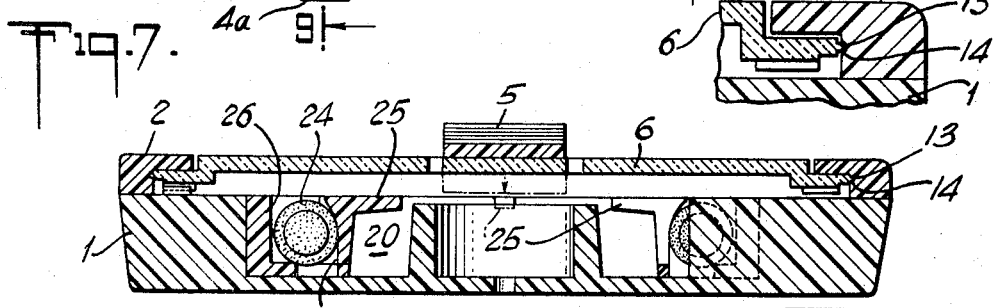
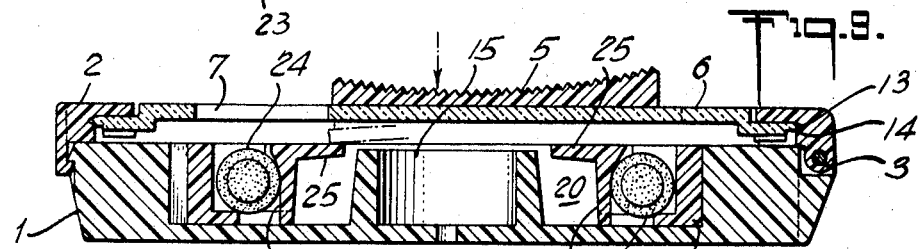
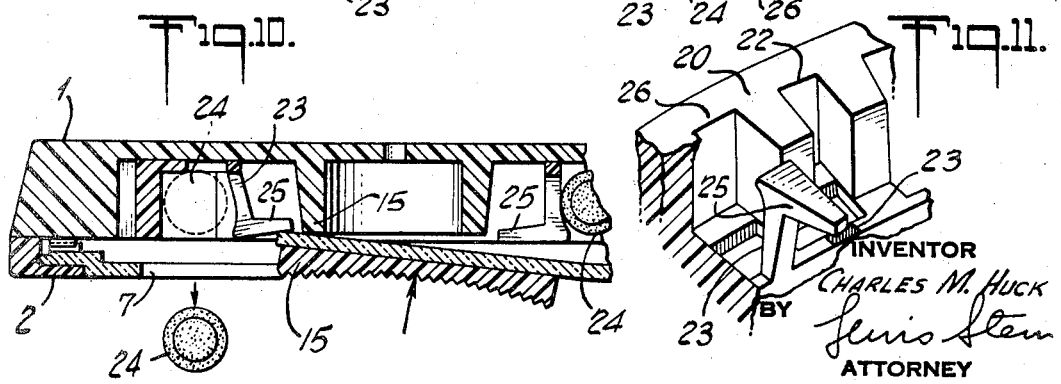

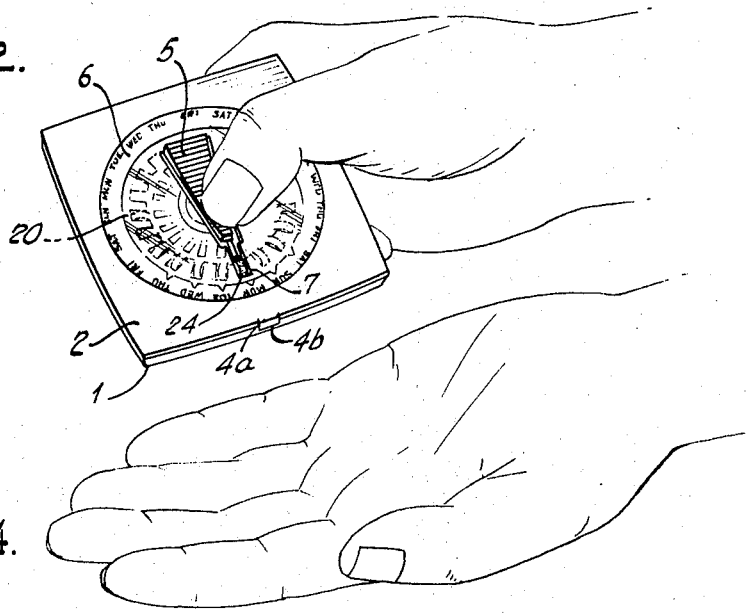
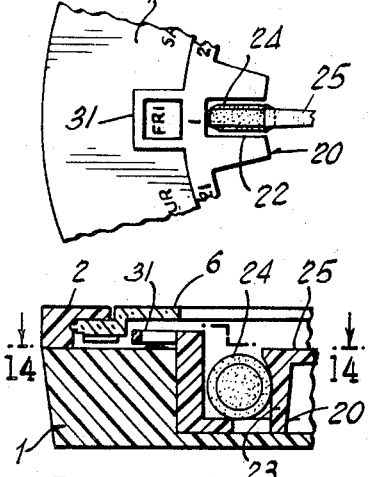
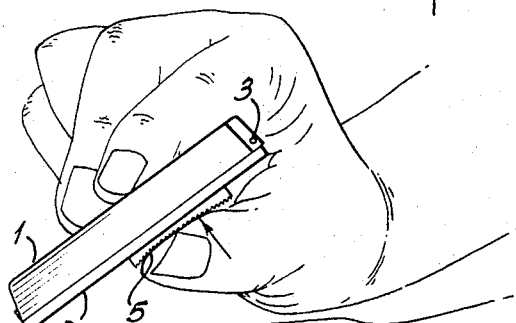
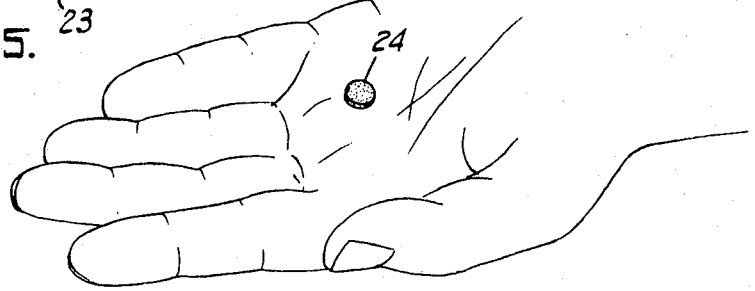

3,437,236
TABLET DISPENSING DEVICE
Charles M. Huck, Bound Brook, N.J., assignor to Ortho Pharmaceutical Corporation, a corporation of New Jersey
Filed Sept. 26, 1967, Ser. No. 670,637
Int. Cl. B65h 3/28
U.S. Cl. 221—86                           4 Claims

ABSTRACT OF THE DISCLOSURE

A tablet dispensing device formed from a single piece of resilient material which holds tablets in a fixed position, with a releasing means associated with each tablet.

---

The present invention is related to a dispensing device for medicament containing tablets, and more particularly, it is related to a device having means for holding individual tablets in fixed positions and for selectively releasing said individual tablets.

In the recent past, considerable recognition has been given to the value of devices which dispense medicament containing tablets not only from the standpoint of convenience of the user, but also as an aid to the proper use of the medicaments and to merchandising.

A device such as disclosed in U.S. Patent No. 3,227,127 provides a convenient means for dispensing a medicament which must be taken according to a specific schedule over a single cycle of use, and U.S. Patent No. 3,261,455 discloses a similar device which provides a means for dispensing tablets for several cycles of use.

From the standpoint of the manufacturer, medicament containing tablets, a desirable feature of a tablet dispensing device is the ability of the user to easily refill the device, rather than to require the purchase of a complete device each time new tablets are needed. A number of patents, such as U.S. Patents 3,199,489 and 3,276,573 disclose refillable tablet dispensers.

It is an object of the present invention to provide a device for dispensing medicament containing tablets over a schedule adapted to the individual users needs.

It is also an object of the present invention to provide a tablet dispenser which may be refilled by the user.

It is a further object of the invention to provide tablet containing refills which have means for holding the tablets in a fixed position.

The present invention is particularly well adapted for use in the dispensing of oral contraceptive compounds in tablet form, but may be used equally well for any medicament containing tablet which must be taken according to a prescribed schedule.

The invention is explained in the description which follows and is illustrated in the accompanying drawings in which:

FIG. 1 is a perspective view of the tablet dispenser of the invention;

FIG. 2 is a view of the manner in which a refill cartridge is placed in the tablet dispenser;

FIG. 3 is a perspective view of the dispenser in an open position with refill cartridge removed;

FIG. 4 is a perspective view of a refill cartridge;

FIG. 5 is a cutaway top view of the dispenser with the refill cartridge in place;

FIG. 6 is an inverted plan view of a portion of the base of the cartridge;

FIG. 7 is a sectional view along line 7—7 of FIG. 5;

FIG. 8 is a sectional detail of the cover of the dispenser;

FIG. 9 is a sectional view along line 9—9 of FIG. 5;

FIG. 10 is a partial sectional view of the operation of the dispenser in dispensing position;

FIG. 11 is a detailed view of the tablet release portion of the cartridge;

FIG. 12 and FIG. 13 illustrate the operation of the dispenser;

FIG. 14 illustrates a detailed portion of a modification of the invention; and

FIG. 15 is a sectional view through a portion of the modified dispenser of FIG. 14.

Referring to the drawings, the tablet dispensing device of the invention is shown in FIGURE 1, in which there is a base 1 and a cover 2 joined by hinge 3. The base and cover are held in a closed position by catches 4a and 4b. Positioned within the base 1 is a tablet containing cartridge 20 wherein each tablet is maintained in recesses associated with means for individual release of the tablets.

As may be seen in greater detail in FIGURE 3, the base 1, which may be of any convenient shape, is provided with a circular depression 10. Spaced equidistantly around the circumference of the depression 10 are indicia of time 11 such as the days of the week. In the particular embodiment shown in FIGURE 3, provision has been made for 21 days. However, the device of the invention is adapted to be used over any suitable time span.

Spaced about a segment of the circumference of depression 10 are slots 12. In the embodiment shown in FIGURE 3, there are seven such slots. If time periods other than days of the week are used, the number of slots will be changed accordingly.

Referring now to FIGURE 4, there is seen a tablet containing cartridge 20 which is adapted to fit into depression 10 of base 1. Cartridge 20 is provided with a pointer 21 which is adapted to fit into one of the slots 12 in base 1.

Positioned circumferentially around cartridge 20 are recesses 22 adapted to receive and contain tablets 24. Recesses 22 are formed in the material from which the cartridge is made and have a rigid back portion 26 and a flexible front portion 23. The flexible portion 23 is provided with a release tab 25.

Referring again to FIGURE 1, there is shown a depressible finger grip 5, which finger grip is adapted to exert pressure on release tab 25 when depressed. This action is shown schematically in FIGURE 10.

Cover 2 of the tablet dispensing device is provided with a rotatable disc 6 which may be formed of any convenient material, but which is formed preferably from a transparent plastic material. Disc 6 is held in cover 2 in any manner which permits rotation of the disc. As shown in FIGURES 7 and 8, disc 6 is provided with a circumferential shoulder 13 which snaps into a circumferential groove 14 in cover 2.

Disc 6 is provided with a depressible finger grip 5 which is integrally molded in disc 6. At a point remote from the point at which finger grip 5 is attached to disc 6, there is an opening 7 through which individual tablets 24 are dispensed.

The operation of the tablet dispensing device for dispensing oral contraceptive tablets is as follows:

As shown in FIGURE 2, the tablet containing cartridge 20 is positioned in base 1 with pointer 21 fitted into the pointer channel 12, adjacent to the day indicia 11 for the day on which menstruation started. The cover 2 is closed and the rotatable disc 6 is rotated until the tablet dispensing opening 7 in front of finger grip 5 lies over the fifth tablet from the pointer 21. For convenience, the cartridge may be marked with the numeral "1" or some other distinctive marking to indicate the tablet which is to be dispensed first. As shown in the modification in FIG. 14, a square 31 is fitted to the cartridge to indicate the first tablet to be taken.

As shown in FIG. 12, gripping the dispenser in one hand with the thumb on finger grip 5, the finger grip is depressed. By turning the entire dispenser over, as in FIG. 13, the tablet is removed from the dispenser. Each day, the rotatable disc 6 is moved to the next tablet position and the tablet is dispensed in the manner described above.

In order to limit the downward motion of finger grip 5, a pedestal 15 may be mounted in the center of depression 10 in base 1. However, any convenient means may be used to limit this downward motion.

When all of the tablets have been dispensed, the empty cartridge may be removed and a fresh cartridge inserted.

While the invention has been described with reference to its use for dispensing oral contraceptive tablets, it will be apparent to one skilled in the art that by minor modification, the present invention may be adapted to dispense any medicament which is to be used in accordance with a particular schedule.

Cartridge 20 is shown with tablets 24 held edgewise in recesses 22. In this manner, it is possible to reduce the overall diameter of the cartridge. If desired, the tablets may be held flat in the cartridge.

The cartridge is readily filled with tablets by depressing the release tabs 25 by an appropriate means on the filling machinery. When pressure is removed from the release tabs, the tablets are held in recesses until the individual release tabs are depressed.

What is claimed is:

1. A dispenser for tablets comprising in combination, a member for holding a multiplicity of tablets, said member having a multiplicity of filled tablet receivers spaced in an annular pattern around said member:

said dispenser also having means to restrain said tablets against both radial and axial movement, at least a portion of said restraining means for each tablet being hingedly mounted and angularly moveable away from its restraining position to provide an aperture through which said tablet may be dispensed, said dispenser further comprising tablet releasing means rotatably mounted with respect to the tablet holding member and including a member hingedly mounted thereon and engageable, in turn, with said hingedly mounted restraining means for each tablet, pressure on and deflection of said tablet releasing member resulting in rotational movement of said tablet restraining means to provide said aperture for dispensing.

2. A tablet dispenser of claim 1 further comprising a cover rotatable with respect to the tablet holding member and containing an aperture therein which may be registerable in turn with each tablet receiver so that each tablet may in turn be dispensed, said cover denying access to said hingedly mounted tablet restraining means other than through said tablet releasing means.

3. A tablet dispenser of claim 2 further comprising a base to receive said tablet holding member whereby a refillable dispenser is provided.

4. A dispenser for tablets which comprises in combination a first member for holding a multiplicity of tablets, a second member for holding said first member and a third member for selecting the tablet to be dispensed, said first member comprising a circular member having spaced about its periphery a multiplicity of tablet receiving portions and having associated with each of said tablet receiving portions a resilient tablet releasing means, said second member comprising a base having a circular opening therein, said circular opening being of sufficient diameter to receive said first member, and means associated with said first member and said second member to hold one in fixed relationship to the other, and said third member comprising a cover for said second member, said cover having disposed therein a rotatable portion, said rotatable portion having therein resilient means adapted to engage, in turn, each of the resilient means of said first member and an opening adjacent to said resilient means for the removal of a tablet from said first member.

References Cited

UNITED STATES PATENTS

| | | | |
|---|---|---|---|
| 1,975,364 | 10/1934 | Kindred et al. | 221—86 |
| 2,236,224 | 3/1941 | Raschkind | 206—42 |
| 2,258,777 | 10/1941 | Lermer. | |
| 2,366,886 | 1/1945 | Van Tuyl | 221—88 X |
| 2,534,815 | 12/1950 | Fields | 206—42 X |
| 2,553,257 | 5/1951 | Honeyman. | |
| 3,128,878 | 4/1964 | Ring | 206—42 |
| 3,143,207 | 8/1964 | Wagner | 206—42 |
| 3,288,277 | 11/1966 | Hallerbach | 206—42 |

SAMUEL F. COLEMAN, *Primary Examiner.*